July 25, 1933.  E. A. WORK  1,919,408

CHOKE PLUG

Filed Oct. 20, 1931

INVENTOR.
EDGAR A. WORK
By *Wm. H. Cady*
ATTORNEY.

Patented July 25, 1933

1,919,408

UNITED STATES PATENT OFFICE

EDGAR A. WORK, OF WILMERDING, PENNSYLVANIA, ASSIGNOR TO THE WESTINGHOUSE AIR BRAKE COMPANY, OF WILMERDING, PENNSYLVANIA, A CORPORATION OF PENNSYLVANIA

CHOKE PLUG

Application filed October 20, 1931. Serial No. 570,027.

This invention relates to choke plugs and particularly to venting devices such as are used in various fluid controlled and actuated devices.

In fluid brake systems and fluid operated signal systems, vents are provided for permitting the escape of fluid to the atmosphere or its passage from one chamber of the apparatus to another at predetermined rates or in regulated quantities. Such vents are frequently of relatively small area and the passage of fluid therethrough is frequently prevented by foreign particles in the fluid which lodge in the passage and cause failure of the apparatus.

An object of the invention is to provide a vent device having screening means that while permitting free and easy passage of the fluid to the vent, prevents any particles of sufficient size to obstruct the vent from gaining access thereto.

A further object of the invention is to provide a screened vent device having the above noted characteristics, wherein the inlet orifice is of substantially greater area than that of the fluid limiting passages and comprises a relatively long and narrow opening which arrests foreign particles that would ordinarily clog the fluid limiting passage and which though partially obstructed by such particles, continues to freely pass fluid to the limiting passage.

A further object of the invention is to provide a non-clogging vent device that may be economically applied to a variety of fluid controlled or actuated devices and wherein the parts are readily accessible for inspection and cleaning.

Figure 1:
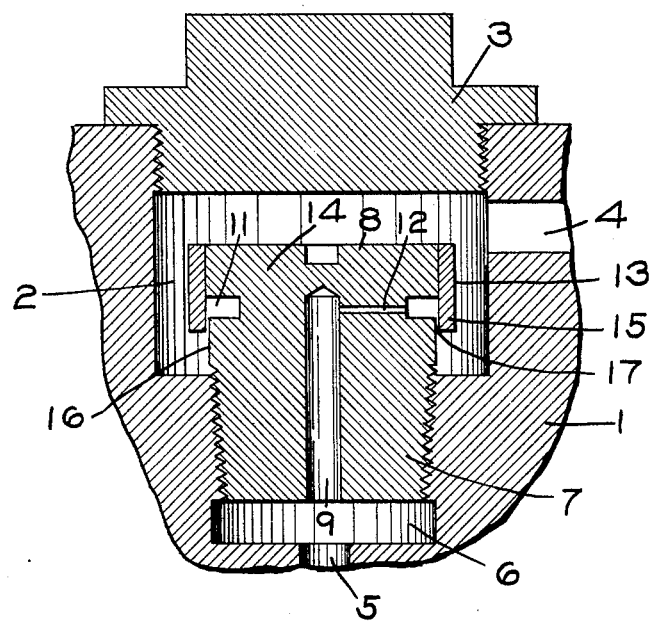
Figure 2:
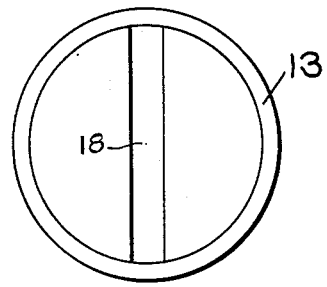

These and other objects that will be made apparent throughout the further description of my invention are obtained by means of the venting device hereinafter described and illustrated in the accompanying drawing; wherein Fig. 1 is a vertical section through a fragment of a fluid controlled device and a choke plug therefor embodying the invention; and Fig. 2 is a top plan view of the choke plug.

Referring to the drawing, the invention is shown as applied to the casing 1 of a fluid controlled device such as a pneumatic brake, the casing of the controlling device being provided with a chamber 2 having its outer open end threaded and closed by a screw plug 3. Fluid enters the chamber from a passage of the fluid controlled device through the inlet passage 4 and is discharged therefrom through an outlet passage 5 of the fluid controlled device having an enlarged threaded portion 6 for receiving the threaded end of a choke plug 7 that is cylindrical in form and which projects into the chamber.

The plug is provided with an interior centrally disposed passage 9 of relatively large diameter communicating with the outlet passage 5, and an annular peripheral groove 11 which communicates with the central passage 9 through a fluid limiting vent 12. This vent is of relatively small diameter and is proportioned with respect to length and diameter to afford a predetermined fluid flow under predetermined pressure conditions.

Since the vent is relatively small, a minute foreign particle in the fluid might lodge therein and cause failure of the apparatus with which it is associated. To obviate this difficulty, a band or cover 13 is shrunk upon, or otherwise secured to, the cylindrical outer end 14 of the plug 7. A depending portion 15 of the band extends across the groove 11 and cooperates with the cylindrical surface 16 of the plug that is slightly reduced in diameter, to define a relatively narrow annular passage 17 which establishes communication between the chamber 2 and the annular groove 11.

The maximum width of the annual passage 17 may be considerably less than the diameter of the limiting vent 12, while the total area of the passage 17 is many times that of the vent 12. Therefore, the velocity of fluid through the annular passage is relatively slow and free passage is afforded. Foreign particles large enough to clog the vent 12 are prevented from gaining access thereto and such small particles that can pass through the annular passage cannot clog the vent 12.

Large particles that lodge across the annular passage 17 cannot appreciably affect the fluid flow therethrough and are not tightly retained because of the relatively low velocity of the fluid through the annular passage. Such particles fall away because of vibration in the apparatus, or turbulence of the air within the chamber and may disintegrate through collision with the walls of the chamber or the plug 7 and band 13.

The inlet port 4 is arranged to discharge laterally across the top of the plug, and since the fluid must pass upwardly into the annular groove 11, the fluid must first pass downward and then upward. Heavy particles may gravitate to the bottom of the chamber 2 and there remain or may be broken into finer particles that can readily pass through the annular passage 17 and vent 12.

The plug 7 is provided on its end surface with a transverse slot 18 for receiving an instrument whereby the plug may be rotated for withdrawal.

While I have shown but one embodiment of my invention, it is obvious that many changes, additions and omissions may be made in the apparatus herein described without departing from the spirit of my invention.

Having now described my invention, what I claim as new and desire to secure by Letters Patent, is:

1. A vent device comprising a cylindrical plug member having a fluid limiting vent therethrough opening into a passage on the periphery of the member, and a cover for the passage having a portion spaced from the member and defining a relatively long and narrow inlet passage communicating with the said passage for arresting foreign particles in the fluid entering the inlet passage.

2. A vent device comprising a cylindrical member having an annular peripheral groove and a relatively large interior vent communicating therewith through a fluid limiting vent, and a cover for the peripheral groove having a portion spaced from the cylindrical surface of the said member and defining an annular inlet orifice of less maximum width than that of the fluid limiting vent.

3. A vent device comprising a closed chamber having an inlet passage and an outlet passage, a vent plug disposed in the outlet passage and projecting into the chamber and having an annular groove in the outer surface thereof, a closure for the groove having a portion spaced from and cooperating with the said member for defining a relatively long and narrow inlet passage, and a fluid limiting vent establishing communication between the annular groove and the said outlet passage.

4. A vent device comprising a closed chamber having an inlet passage and an outlet passage, a vent plug disposed in the outlet passage and projecting upwardly into the chamber from the bottom wall thereof and having an annular groove in the outer surface of the plug and spaced from the bottom wall of the chamber, a depending cover for the groove having its depending portion spaced from the plug for defining a relatively long and narrow inlet slot for directing fluid upwardly into the groove whereby fluid entering the said chamber above the inlet slot is caused to change its direction, and a fluid limiting passage establishing communication between the annular groove and the said outlet passage.

5. A vent device comprising a hollow casing having one end open and the bottom wall thereof provided with a threaded outlet passage, a threaded plug within the outlet passage of less external diameter than the open end of the casing and removable therethrough, a closure for the casing, the said casing having an inlet passage and the said plug having an annular peripheral groove, a fluid limiting passage in the plug establishing communication between the said groove and the said outlet passage, and a cover partially closing the groove and defining a relatively narrow annular inlet passage.

EDGAR A. WORK.